United States Patent
Kiani et al.

(10) Patent No.: US 9,847,749 B2
(45) Date of Patent: Dec. 19, 2017

(54) POOL SOLAR POWER GENERATOR

(71) Applicant: MASIMO SEMICONDUCTOR, INC., Irvine, CA (US)

(72) Inventors: Massi Joe E. Kiani, Laguna Niguel, CA (US); Steven J. Wojtczuk, Lexington, MA (US); Brad M. Siskavich, Amherst, NH (US)

(73) Assignee: MASIMO SEMICONDUCTOR, INC., Irvine, CA (US)

( * ) Notice: Subject to any disclaimer, the term of this patent is extended or adjusted under 35 U.S.C. 154(b) by 0 days.

(21) Appl. No.: 14/850,795

(22) Filed: Sep. 10, 2015

(65) Prior Publication Data
US 2016/0072429 A1 Mar. 10, 2016

Related U.S. Application Data

(63) Continuation of application No. 14/107,945, filed on Dec. 16, 2013, now abandoned.

(60) Provisional application No. 61/737,841, filed on Dec. 17, 2012, provisional application No. 61/778,447, filed on Mar. 13, 2013.

(51) Int. Cl.
*H02S 20/32* (2014.01)
*H02S 40/22* (2014.01)
(Continued)

(52) U.S. Cl.
CPC ............... *H02S 20/32* (2014.12); *E04H 4/08* (2013.01); *E04H 4/14* (2013.01); *F24J 2/18* (2013.01);
(Continued)

(58) Field of Classification Search
CPC ........ H02S 20/32; H02S 40/22; H02S 40/425; H02S 30/20; F24J 2/18; F24J 2/423; F24J 2/42; F24J 2/0472; F24J 2/0461; E04H 4/08; E04H 4/14; Y02E 10/40; Y02E 10/52; Y02B 10/20; Y02B 10/12
See application file for complete search history.

(56) References Cited

U.S. PATENT DOCUMENTS 3,339,066 A * 8/1967 Hart .................. F21S 8/00
362/267
3,986,310 A * 10/1976 van den Broek ..... E04H 4/0043
4/506
(Continued)

OTHER PUBLICATIONS

G.M. Tina, Optical and thermal behavior of submerged photovoltaic solar panel: SP2, Oct. 1, 2011, Energy 39 (2012) 17-26.

*Primary Examiner* — Jeffrey T Barton
*Assistant Examiner* — Michael Y Sun
(74) *Attorney, Agent, or Firm* — Knobbe, Martens, Olson & Bear LLP (57) ABSTRACT

Solar panels located on residential roofs can be unsightly in some cases. A swimming pool solar power generator can locate solar panels in or around the sides and/or bottoms of a swimming pool in a manner so as to create electricity from the sun without creating an eyesore. In an embodiment, a pool solar power generator includes a solar cell module disposed in a portion of a swimming pool. The solar cell module can include solar cells and be submerged under water held by the swimming pool. The solar cell module can convert sunlight incident on the solar cells to electricity and transmit the electricity for use at a location external to the swimming pool.

16 Claims, 6 Drawing Sheets

(51) Int. Cl.
  *E04H 4/14* (2006.01)
  *F24J 2/42* (2006.01)
  *E04H 4/08* (2006.01)
  *H02S 30/20* (2014.01)
  *H02S 40/42* (2014.01)
  *F24J 2/18* (2006.01)
  *F24J 2/04* (2006.01)

(52) U.S. Cl.
  CPC ................ *F24J 2/42* (2013.01); *F24J 2/423* (2013.01); *H02S 30/20* (2014.12); *H02S 40/22* (2014.12); *H02S 40/425* (2014.12); *F24J 2/0461* (2013.01); *F24J 2/0472* (2013.01); *Y02B 10/12* (2013.01); *Y02B 10/20* (2013.01); *Y02E 10/40* (2013.01); *Y02E 10/52* (2013.01)

(56) References Cited

U.S. PATENT DOCUMENTS

| | | | |
|---|---|---|---|
| 5,664,769 A * | 9/1997 | Sadinsky | E04H 4/06 256/25 |
| 5,860,413 A | 1/1999 | Bussey et al. | |
| 6,384,726 B1 * | 5/2002 | Epple | E04H 4/101 340/545.6 |
| 7,118,678 B2 | 10/2006 | Porat | |
| 2001/0029626 A1 * | 10/2001 | Mathis | E04H 4/101 4/502 |
| 2005/0102745 A1 * | 5/2005 | Last | E04H 4/082 4/502 |
| 2009/0000221 A1 * | 1/2009 | Jacobs | H01L 31/0482 52/173.3 |
| 2009/0025134 A1 * | 1/2009 | Stephens | E04H 4/101 4/498 |
| 2009/0229652 A1 | 9/2009 | Mapel et al. | |
| 2011/0088340 A1 | 4/2011 | Stobbe | |
| 2011/0094564 A1 * | 4/2011 | McCall | F24J 2/12 136/246 |
| 2011/0114080 A1 * | 5/2011 | Childers | F03G 7/06 126/601 |
| 2012/0019195 A1 * | 1/2012 | Gagnon | B60L 11/1816 320/107 |
| 2013/0145538 A1 | 6/2013 | Seccareccia | |
| 2014/0166076 A1 | 6/2014 | Kiani et al. | |
| 2015/0292772 A1 * | 10/2015 | Murphy | F24J 2/0461 126/714 |

\* cited by examiner

POOL SOLAR POWER GENERATOR

REFERENCE TO RELATED APPLICATIONS

The present application claims priority benefit from U.S. Provisional Application No. 61/737,841, filed Dec. 17, 2012, entitled "Pool Solar Power Generator," and U.S. Provisional Application No. 61/778,447, filed Mar. 13, 2013, entitled "Pool Solar Power Generator," both of which are incorporated herein by reference.

BACKGROUND

Solar systems come in two generic types, fixed flat-plate one-sun panels using cheaper less efficient solar cells (say 16% efficient at one sun) and tracking concentrator systems using expensive high efficiency cells (say 42% efficient at 500 suns). Fixed flat-plate systems have a lower initial cost and are often used in residential applications. Tracking systems have a much higher initial cost and are normally used in larger-scale utility-level installations. The key metric can be $/watt and therefore more costly cells may be justified in tracking system embodiments, in some cases.

SUMMARY

Solar panels located on residential roofs can be unsightly. A swimming pool solar power generator advantageously can, in certain embodiments, locate solar panels in or around a swimming pool in a manner so as to create electricity from the sun without creating an eyesore.

An initial analysis of underwater solar energy collection is warranted in view of water attenuation of solar energy. Although water can transmit visible light fairly well, it can absorb infrared light. As such, a solar cell under eight feet of water, a typical pool depth, can have about half the power output as a solar cell in air. The short-circuit current density (Jsc), a key area-normalized solar cell parameter, can be 18.1 mA/cm$^2$ for five feet of water and 16.7 mA/cm$^2$ for eight feet of water. Jsc can be 30.1 mA/cm$^2$ in air. Solar panel efficiencies can typically be about 16% in air and scale with the Jsc. Hence, 16.7/30.1×16%=9% can be the solar cell efficiency for eight feet of water and 18.1/30.1×16%=9.6% can be the solar cell efficiency for five feet of water. Although sub-optimal, a reasonable tradeoff can be aesthetic gain for a loss in pure efficiency.

The above calculations tacitly assume the sun is overhead at its zenith. If solar energy impinging on the pool sidewalls may be considered, these calculations then depend on how the solar cells are oriented with respect to the sun. Solar cell orientation to the sun, in turn, can depend on latitude, longitude, time of year and time of day. Indeed, panels on the sides of pools may be more efficient in some instances. For example, the light path to panels near the water surface can involve less of a path in the water. However, even though panels on the pool sides may be more efficient, they may not generate as much power as panels on the pool bottom because of the reduction in incident light. For example, when the sun is directly overhead at noon, very little light may be incident on the pool sidewalls. At sunrise or sunset, only two pool sidewalls may be illuminated in some cases.

For purposes of summarizing, certain aspects, advantages and novel features of the disclosure have been described herein. Of course, it is to be understood that not necessarily all such aspects, advantages or features will be embodied in any particular embodiment.

BRIEF DESCRIPTION OF THE DRAWINGS

The following drawings and the associated descriptions are provided to illustrate embodiments of the present disclosure and do not limit the scope of the claims.

DETAILED DESCRIPTION

Figure 1:
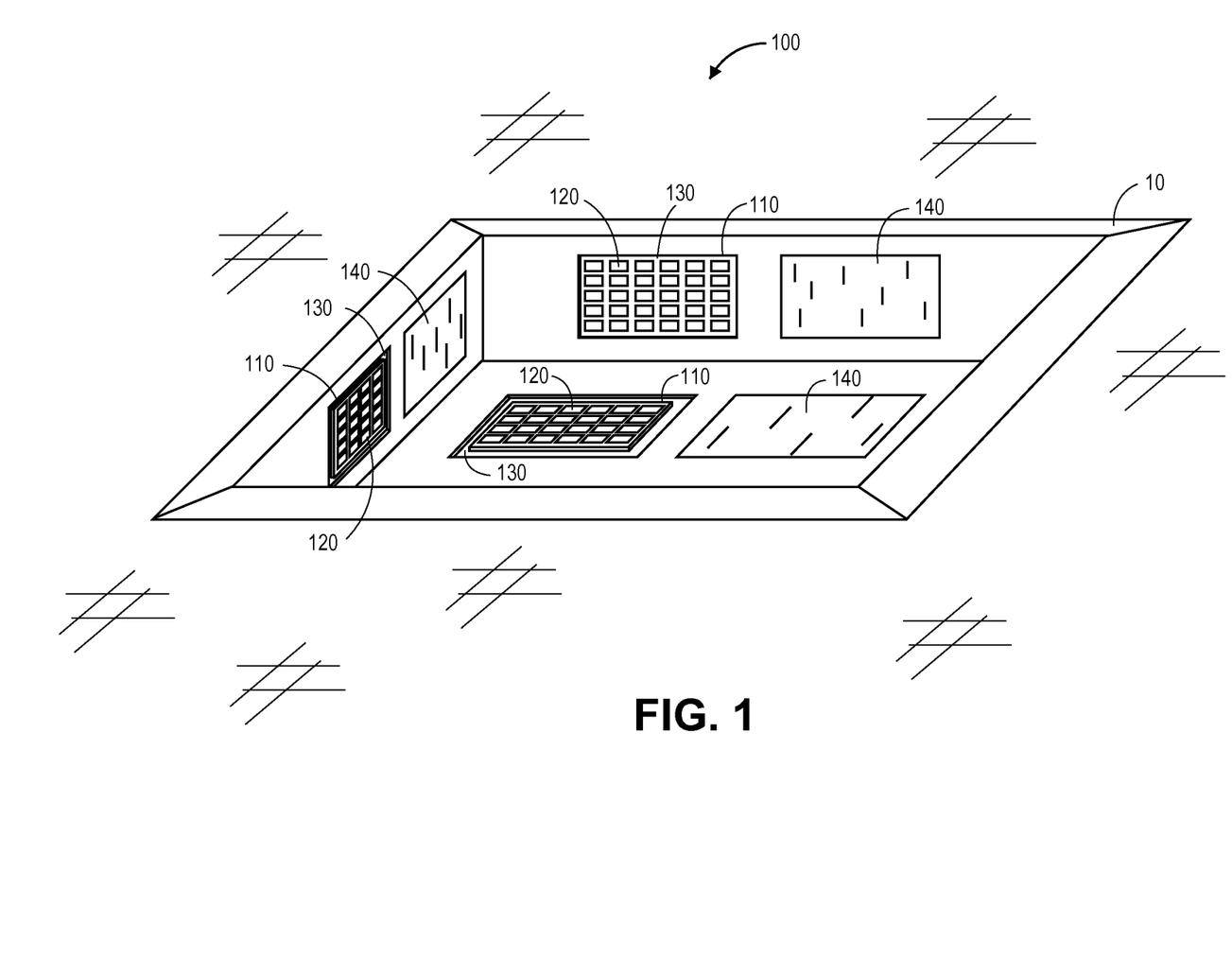
FIG. 1 is a perspective illustration of a pool solar power generator embodiment having one or more pool bottom or side mounted solar power panels.

FIG. 1 illustrates a pool solar power generator embodiment 100 having one or more pool-bottom or pool-side mounted solar power panels 110 in a pool 10. Each solar panel 110 has an array of solar cell modules 120, which can comprise an array of solar cells. One or more solar panels 110 can be each located in a pool-bottom or pool-side recess 130 having a retractable cover 140. The cover 140 can function to hide or protect the solar panel(s) 110 when the pool is actively in use. The cover 140 can be remotely or manually driven to mechanically slide open and close. The cover 140 can be a rigid plastic or metal shutter that can have remotely driven louvers that open and close. In an embodiment, the solar panel(s) 110 may be tilted up or down or repositioned to achieve an advantageous angle or position relative to the sun. Safety features can be implemented which lock a pool gate or turn on a visual or audible alarm to prevent pool use when the cover 140 is open or when the solar panel(s) 110 are tilted away from the pool bottom or sides. In various embodiments, an electrical grid can be constructed in the swimming pool for each of the solar panel(s) 110. For example, wires or other electrical interconnects can be routed in or below the pool plaster or concrete at the time of pool construction or retrofitted into an existing pool.

Figure 2:
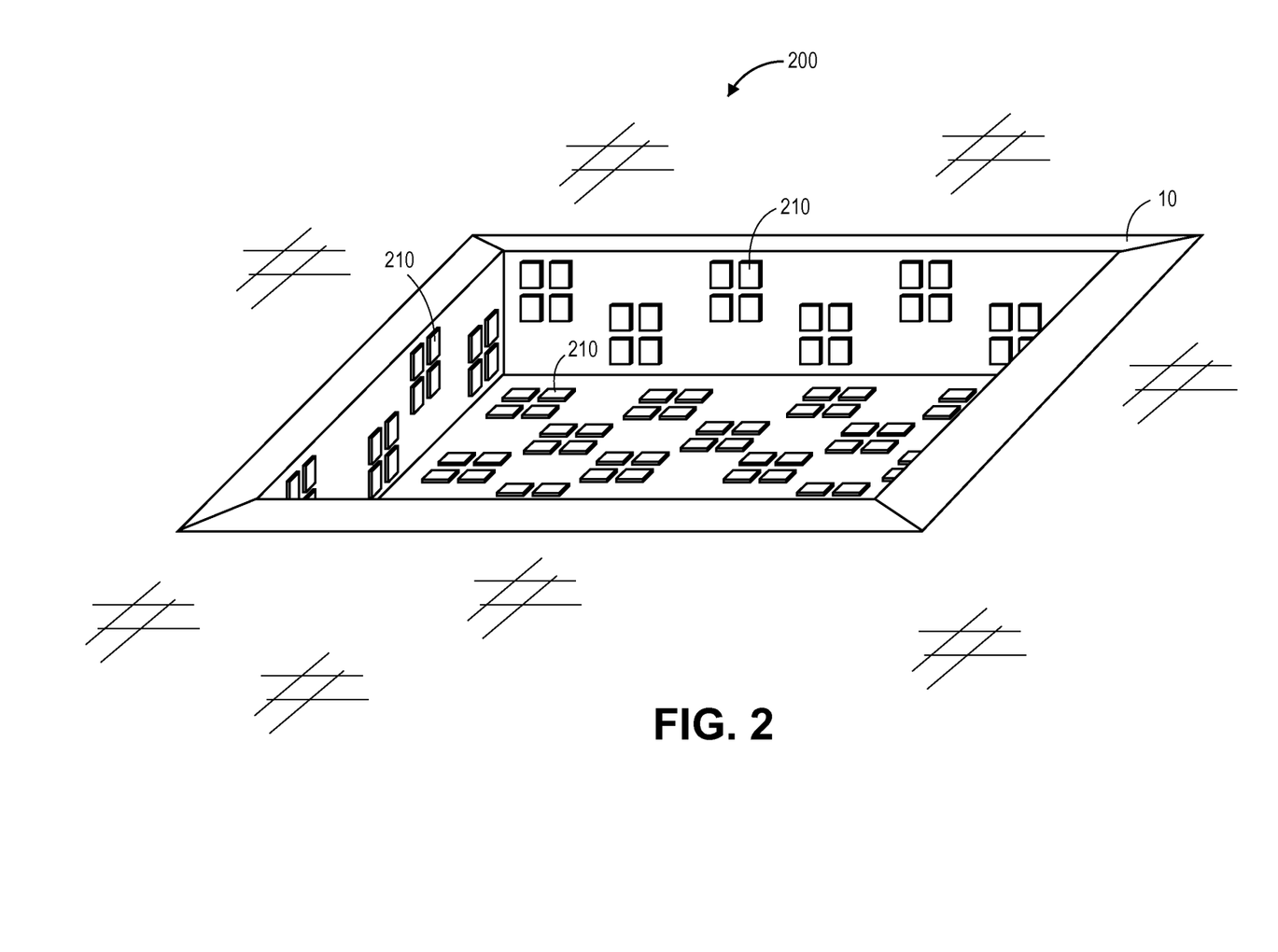
FIG. 2 is a perspective illustration of a pool solar power generator embodiment having pool bottom or side mounted solar power modules.

FIG. 2 illustrates a pool solar power generator embodiment 200 having multiple solar cell modules 210 including solar cells. Multiple modules 210 can be arrayed around a pool bottom or sides and plugged into an electrical grid as described herein. The modules 210 may be decorative so as to appear as standard pool tiles. The decorative effect may be enhanced by an electrically-switchable LCD film layer placed over the solar cells in some embodiments. The LCD layer can be transparent during an operational (solar power generation) mode and decoratively opaque during an idle mode. In an embodiment, the LCD film layer can be colored and shaped to enhance the decorative effect. In an embodiment, one or more lenses can be attached to the module surface so as to focus incident light onto the solar cells. In an embodiment, the lenses can be plano convex.

Figure 3:
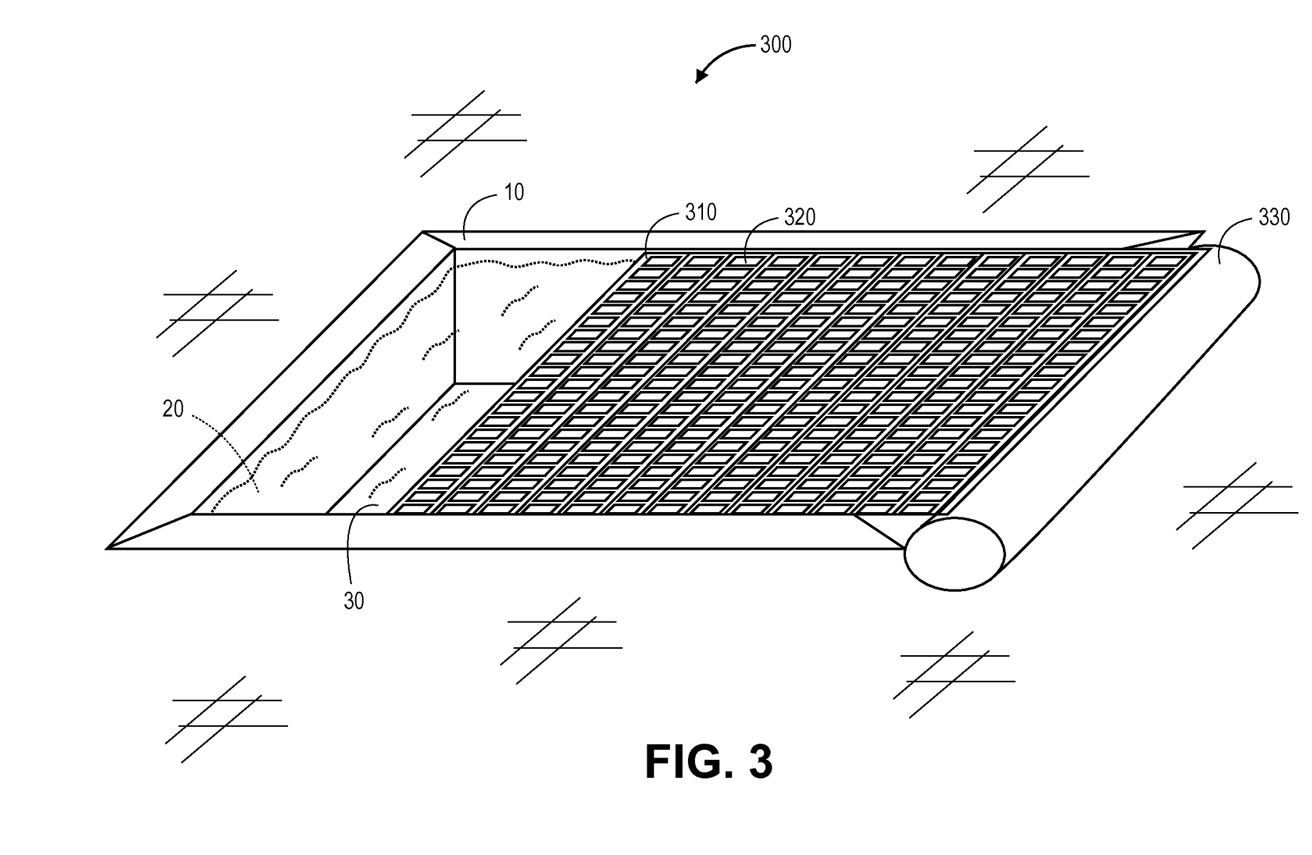
FIG. 3 is a perspective illustration of a pool solar power generator embodiment having a retractable pool surface cover or pool bottom cover having integrated solar power modules.

FIG. 3 illustrates a pool solar power generator embodiment 300 having multiple solar cell modules 320 integrated into a rollable sheet 310 that, for instance, either can float on the water surface 20 or be weighted or tracked so as to roll-out along the pool bottom 30. In a pool surface embodiment, the solar cell sheet 310 can be rolled-up into a storage container 330 when not in use. The storage container 330 may be above-ground proximate the pool edge or buried near the pool edge for aesthetic purposes. In a pool bottom embodiment, the storage container 330 can be installed proximate the pool bottom 30 outside the pool side-walls so that the solar cell sheet 310 can extend from and retract into the storage container 330 via a sidewall slot proximate the pool bottom. In some embodiments, electrical wiring can also be embedded in the rollable sheet 310, helping to reduce the amount of installed wiring and connectors along the pool bottom or sides or within the plaster or concrete.

In another embodiment, the rollable sheet 310 can include one or more lenses in place of the solar cell modules 320, and the rollable sheet 310 can be a light-weight, optically-transparent or semi-transparent carrier. The lenses of the rollable sheet 310 can focus solar energy on a corresponding array of solar cells. Advantageously, the rollable sheet can transfer solar energy in the form of heat to the pool water. When not in use, the rollable sheet 310 can rolled or folded and manually placed into storage. In some embodiments, multiple rollable sheets 310 can be used to focus or collect solar energy.

FIGS. 4A, 4B, and 5-7 illustrate a solar power concentrator 400 embodiment of a pool solar power generator. The sun's output can be about 1 kW/m$^2$ on the earth's surface. Each 1 m$^2$ collection area may be filled with 1 m$^2$ of flat-plate solar cells or, alternatively, a concentration system may be used to collect light over a plurality of 1 m$^2$ areas with a lens or mirror and focus the collected light onto a smaller area of cells. Either choice can fully utilize the energy of each of the 1 m$^2$ areas of incident sunlight, but the concentrator advantageously can utilize a smaller area of photocells.

Figure 4A:
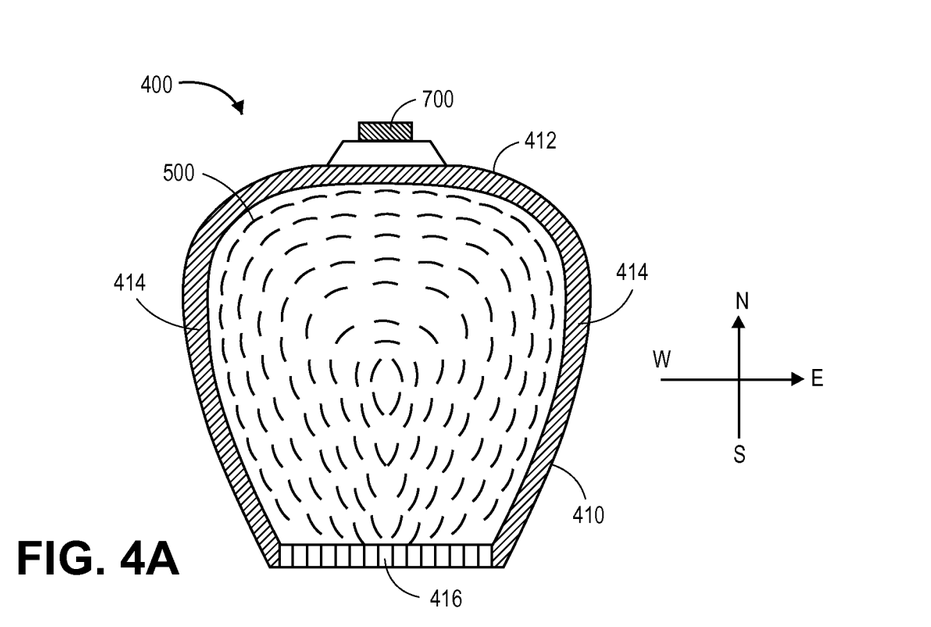
FIGS. 4A-B are top and cutaway side views of a pool solar power generator embodiment having a solar power concentrator.
Figure 4B:
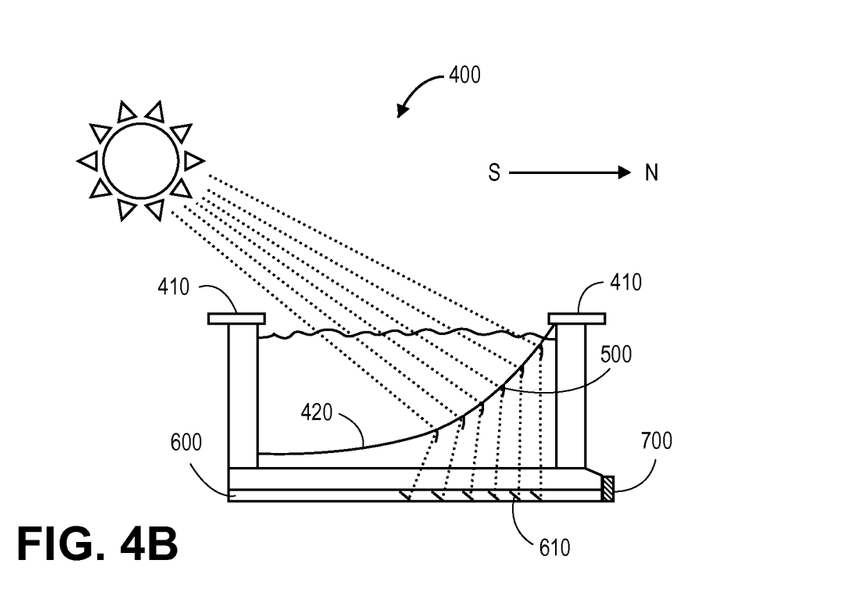
Figures 5, 6:
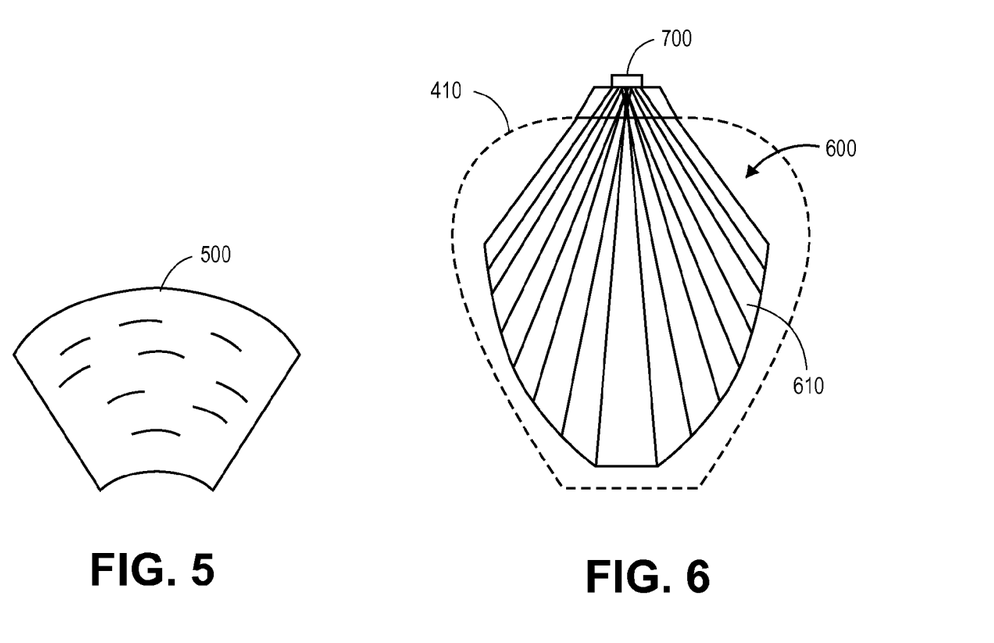
FIG. 5 is a mirror-face view of a first collector mirror embodiment for a solar power concentrator.
FIG. 6 is a top view of a second collector mirror embodiment for a solar power concentrator.

The solar power concentrator 400 can be configured in a funnel-like circular arrangement and focus light onto a solar array 700. A pool bottom 420 can be configured with glass tiles having primary mirrors 500 of various shapes on the tile back sides so as to redirect sunlight toward the pool bottom and into the solar array 700. Advantageously, this arrangement can keep water away from the solar cells. The redirected light from the primary mirrors 500 can impinge upon secondary mirrors 610, which can transmit the redirected light down a plurality of channels 600 (FIG. 6). The channelized light then can impinge upon the solar array 700. In an embodiment, the solar array 700 can be a "dense receiver array" (DRA) having concentrated photovoltaic (CPV) cells on its face. The DRA can convert the concentrated sunlight to electricity. The pool water can cool the cells and, as a side benefit, the pool water can be heated. In some embodiments, the primary mirrors 500 or secondary mirrors 610 of the solar power concentrator 400 can be designed and constructed to effectively "follow" the sun's path across the sky to focus light onto the solar array 700. In other embodiments, the solar power concentrator 400 can actively track the sun by adjusting the tilt angle or position of one or more of the primary mirrors 500 or secondary mirrors 610.

Advantageously, in some embodiments, the solar power concentrator 400 can obviate installing solar cells underwater and, hence, reduce design and production costs and increase reliability. Further, CPV cells can be tailored to specific wavelengths of light (visible through IR) so that the IR absorption of water may have less of an effect. This can result in higher CPV efficiencies. The DRA can generate both electricity and hot water, making the unit a highly energy efficient swimming pool application. The DRA can be easily removed and replaced, in some embodiments, as compared with underwater installed solar cells. In an embodiment, the DRA can be integrated with a battery and pump unit so as to be self-powering and operate without connecting the pool to a utility power grid.

As shown in FIGS. 4A and 4B, the solar pool concentrator 400 can be a swimming pool advantageously shaped, oriented, and mirrored so as to collect solar energy over a relatively large area and focus that energy onto a relatively smaller area for electrical power conversion. In an embodiment, the solar pool concentrator 400 can be generally oriented in a north-south direction so as to substantially maximize exposure to the sun as it moves from east to west. In an embodiment, the solar pool concentrator 400 can have a perimeter 410 around the swimming pool, a relatively-wide pool north end 412, a relatively-narrow pool south end 416, with tapered pool edges 414 that curve from the wide north end 412 to the narrow south end 416. The solar pool concentrator 400 can have a relatively deep bottom 420 disposed at the south end 416 and a relatively shallow bottom 420 disposed at the north end 412. A plurality of primary mirrors 500 can be installed along the pool bottom 420 and oriented to generally focus sunlight onto a plurality of channels 600. In an embodiment, the channels 600 can be reflective tubes buried in concrete.

FIG. 5 illustrates one of the primary mirrors 500 advantageously shaped to redirect sunlight to one or more corresponding secondary mirrors 610 arrayed underneath a pool bottom and into the solar receiver 700. The individual primary mirrors 500 can be disposed on the back side of a sunlight transmissive pool tile. In an embodiment, one or more individual tiles can be flatly disposed along the pool bottom 420 (FIG. 4B) and even with pool bottom surface, with the individual tile primary mirror 500 inside the tile oriented at an angle to the pool bottom as shown in FIG. 4B. The primary mirrors 500 can be configured in various shapes and orientations corresponding to the location of the corresponding tiles along the pool bottom and a corresponding secondary mirror 610 location or channel 600 location underneath the primary mirrors 500.

FIG. 6 is a top view of a collector mirror embodiment for a solar pool concentrator 400. In various embodiments, the channels 600 can be highly reflective tubes buried in concrete beneath the pool bottom 420 (FIG. 4B). The channels 600 can have inlet mirrors 610 (FIG. 4B) disposed at an angle to the tubes.

Figure 7:
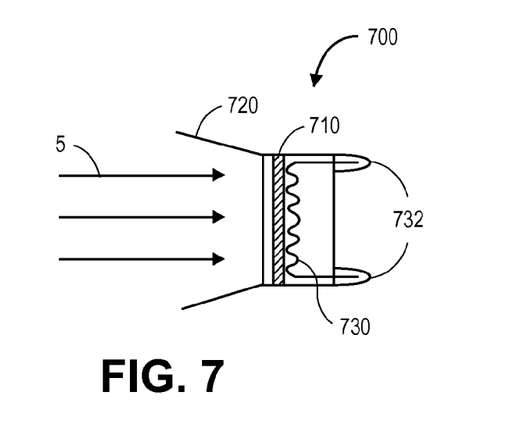
FIG. 7 is a cutaway side view of a dense receiver array (DSR) solar cell embodiment for a solar power concentrator.

FIG. 7 is a cutaway side view of solar power generator 700 embodiment for a solar pool concentrator 400. The generator 700 can include a solar cell array 710 that receives impinging light 5 directed to the generator 700 from the primary mirrors 500 via the channels 600. A reflector 720 can focus the impinging light on the solar cell array 710. A micro-channel cooler 730 can have pool water input and output ports 732 for cooling the array 710, which may also advantageously heat the pool water.

Figure 8:
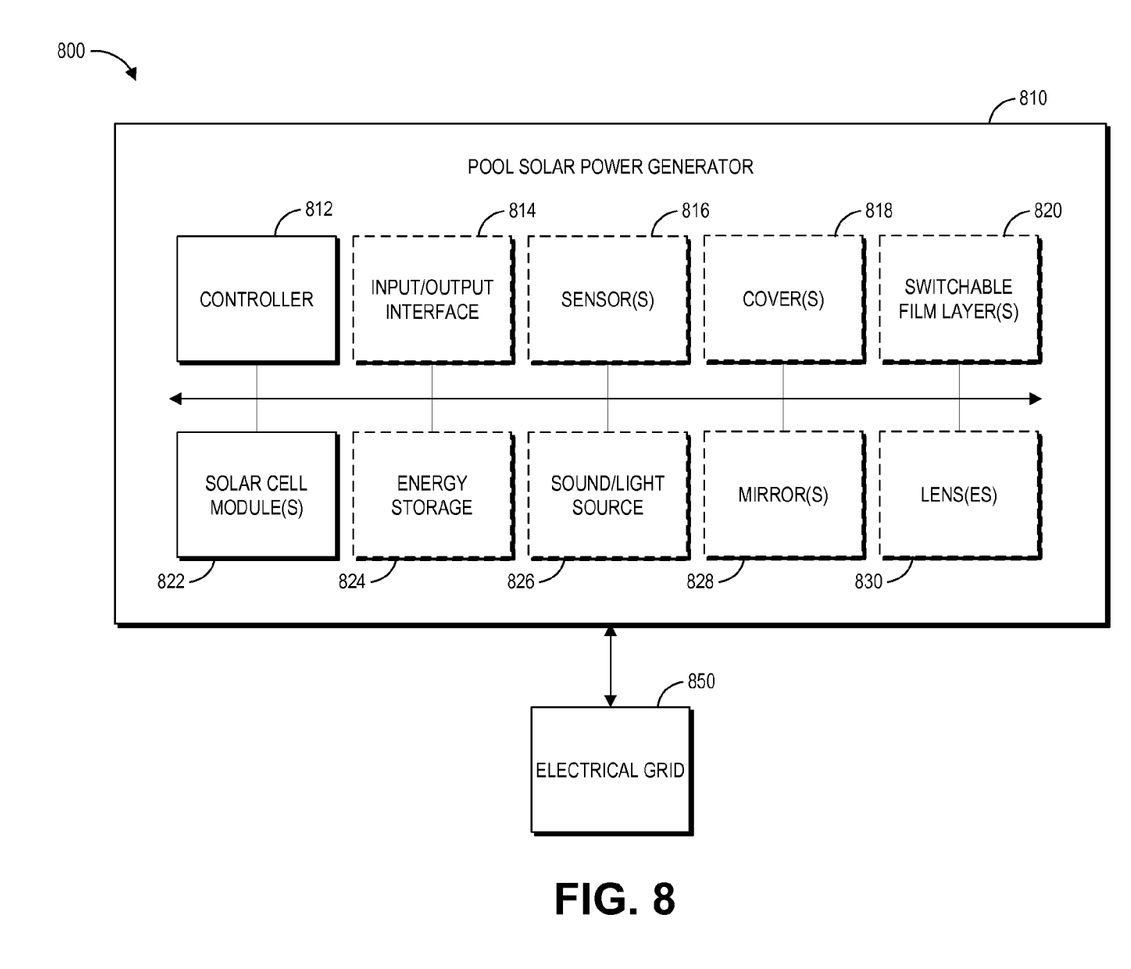
FIG. 8 illustrates an example pool solar power generator system.

FIG. 8 illustrates an example pool solar power generator system 800. The system 800 includes a pool solar power generator 810 associated with a swimming pool and an electrical grid 850. As illustrated, the pool solar power generator 810 includes a controller 812, an input/output interface 814, sensor(s) 816, cover(s) 818, switchable film layer(s) 820, solar cell module(s) 822, an energy storage 824, a sound/light source 826, mirror(s) 828, and lens(es) 830, which can be in communication with one another. Although the pool solar power generator 810 as illustrated includes multiple different components, the pool solar power generator 810 may not include one or more of the illustrated components depending on a particular implementation. The components denoted by dotted lines, for instance, can be optional, changeable, or selectable components of the pool solar power generator 810. In one example, the pool solar power generator embodiment 100 corresponding to the system 800 may or may not include the mirror(s) 828 or lens(es) 830 in some embodiments. As another example, the solar pool concentrator 400 corresponding to the system 800 may or may not include the cover(s) 818 in certain embodiments.

In some embodiments, the cover(s) 818 can correspond to the cover 140 or the rollable sheet 310, the switchable film layer(s) 820 can correspond to the electrically-switchable LCD film layer of the modules 210, the solar cell module(s) 822 can correspond to the solar panel(s) 110 or the solar cell modules 320, the mirror(s) 828 can correspond to the primary mirrors 500 or the secondary mirrors 610, and the lens(es) 830 can correspond to the lenses of the pool solar power generator embodiments 200, 300, or 400, for example.

The controller 812 can process and control operation of the components of the pool solar power generator 810. The controller 812 may automatically control the components based on stored program instructions in a memory and/or as a result of a user command received via the input/output interface 814, for example. The controller 812 can include a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor can be a microprocessor, conventional processor, controller, microcontroller, state machine, and the like. A processor can also be implemented as a combination of computing devices, for instance, a combination of a DSP and a microprocessor, a plurality of microprocessors, one or more microprocessors in conjunction with a DSP core, or any other such configuration. In addition, the term "process" is a broad term meant to encompass several meanings including, for example, implementing program code, executing instructions, manipulating signals, filtering, performing arithmetic operations, and the like.

The controller 812 can control the position of the cover(s) 818. For instance, upon receipt of a user command via the input/output interface 814, the controller 812 can provide a signal to instruct a motor of the cover(s) 818 to open or close the cover(s) 818. In another example, a timer maintained by the controller 812 can be used to trigger the transmission of an instruction to the motor of the cover(s) 818 open or close, such as for instance to daily open the cover from 12 P.M. to 2 P.M. but close the cover from 2 P.M. to 6 P.M. Thereby, in some embodiments, the solar cell module(s) 822 can be unseen or inactive during routine use of the swimming pool.

The controller 812 can control the opacity of the switchable film layer(s) 820, which may cover or be part of the solar cell module(s) 822, by sending the control signal to the switchable film layer(s) 820. When the controller 812 determines that the solar cell module(s) 822 should be in an operational mode, a signal can be sent to the switchable film layer(s) 820 that causes the switchable film layer(s) 820 to become transparent. On the other hand, when the controller 812 determines that the solar cell array(s) should be in an idle mode, a signal can be sent to the switchable film layer(s) 820 that causes the switchable film layer(s) 820 to become opaque. As a result, in some embodiments, the solar cell module(s) 822 can be unseen or inactive during routine use of the swimming pool.

The controller 812 can control the tilt or position of the solar cell module(s) 822, the mirror(s) 828, or the lens(es) 830. A control signal can be transmitted by the controller 812 to one or more tilt motors or positional motors of the components to adjust the tilt about a pivot or position, for example, along a track of the solar cell module(s) 822, the mirror(s) 828, or the lens(es) 830. In an embodiment, the controller 812 can utilize a detected strength of incident light from the sensor(s) 816 or a measure of energy produced by the solar cell module(s) 822 to control the tilt or position of the solar cell module(s) 822, the mirror(s) 828, or the lens(es) 830. For instance, the tilt or position of the components can be adjusted to maximize the detected strength of incident light on a sensor of the sensor(s) 816 or the energy produced by the solar cell module(s) 822.

The controller 812 can control the safety features of the pool solar power generator 810. In an embodiment, a signal can be sent to a lock mechanism of a pool entry gate to prevent entry to a swimming pool area when the solar cell module(s) 822 may be exposed or tilted. The lock mechanism of the gate can be released by another signal from the controller 812 when the solar cell module(s) 822 may not be exposed or tilted. In an embodiment, the sensor(s) 816 can include one or more of a motion sensor, heat sensor, or the like configured to detect the presence of a person, animal, or object near a swimming pool. If a person, animal, or object is detected, the controller 812 can initiate various safety features, such as removing the tilt of the solar cell module(s) 822, closing the cover(s) 818, triggering an audible or visual alarm via the sound/light source 826, or inactivating the solar cell module(s) 822 so that the solar cell module(s) 822 no longer output electrical power.

The controller 812 can control the flow of swimming pool water used to cool the solar cell module(s) 822. For example, the controller 812 can send a signal to a valve or pump associated with the solar cell module(s) 822 to increase or decrease a flow rate of the swimming pool water through one or more channels used to cool the solar cells of the solar cell module(s) 822.

The pool solar power generator 810 and the electrical grid 850 can be in electrical communication with one another. For instance, the pool solar power generator 810 can transmit electrical energy collected using the solar cell module(s) 822 to the electrical grid 850. The electrical grid 850 can be located external to the swimming pool and include a household power grid or utility power grid, in some examples. The energy storage 824 can include a local storage used by the pool solar power generator 810 to store energy collected by the solar cell module(s) 822, and in some implementations, can be used to power one or more components of the pool solar power generator 810.

In addition to those processes described above, other processes and combination of processes will be apparent to those of skill in the art from the present disclosure. Those of skill will further appreciate that the various illustrative logical blocks, modules, and steps described in connection with the embodiments disclosed herein may be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. Skilled artisans can implement the described functionality in varying ways for each particular application, but such implementation decisions should not be interpreted as causing a departure from the scope of the present disclosure.

The steps of a method or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, a DVD, or any other form of storage medium known in the art. A storage medium is coupled to the processor such that the processor can read information from, and write information to, the storage medium. In the alternative, the storage medium can be integral to the processor. The processor and the storage medium can reside in an ASIC. The ASIC can reside in a user terminal. In the alternative, the processor and the storage medium can reside as discrete components in a user terminal.

Although the foregoing has been described in terms of certain embodiments, other embodiments will be apparent to those of ordinary skill in the art from the disclosure herein. Additionally, other combinations, omissions, substitutions and modifications will be apparent to the skilled artisan in view of the disclosure herein. It is contemplated that various aspects and features of the disclosure described can be practiced separately, combined together, or substituted for one another, and that a variety of combinations and subcombinations of the features and aspects can be made and still fall within the scope of the disclosure. Furthermore, the systems described above need not include all of the modules and functions described in the preferred embodiments. Accordingly, the present disclosure is not intended to be limited by the reaction of the preferred embodiments, but is to be defined by reference to the appended claims.

What is claimed is:

1. A pool solar power generator comprising:
   a solar cell module disposed in a recess of an inner wall of a swimming pool, the solar cell module comprising solar cells and configured to convert sunlight from a sun incident on the solar cells to electricity and transmit the electricity for use at a location external to the swimming pool via wiring disposed in the inner wall;
   a sensor configured to detect when a person is in a vicinity of the swimming pool; and
   a controller in communication with the sensor, the controller configured to:
      selectively expose the solar cells to the sunlight and conceal the solar cells from the sunlight,
      in response to detecting with the sensor that the person is in the vicinity of the swimming pool, automatically conceal the solar cells from the sunlight, and
      adjust a position or a tilt of the solar cells based at least on a position of the sun relative to the swimming pool or a measure of energy produced by solar cell module so that an amount of energy produced by the solar cell module increases.

2. The pool solar power generator of claim 1, further comprising an electrically-switchable film layer over at least part of the solar cell module, the electrically-switchable film layer configured to be either transparent or opaque, and wherein the controller is configured to, in response to detecting with the sensor that the person is in the vicinity of the swimming pool, automatically conceal the solar cells from the sunlight by causing the electrically-switchable film layer to transition from transparent to opaque.

3. The pool solar power generator of claim 1, further comprising a cover configured to transition between a first position where the cover conceals the solar cells from the sunlight and a second position where the solar cells are exposed to the sunlight, and wherein the controller is configured to, in response to detecting with the sensor that the person is in the vicinity of the swimming pool, automatically conceal the solar cells from the sunlight by causing the cover to transition from the second position to the first position.

4. The pool solar power generator of claim 3, wherein the cover is configured to be submerged under water held by the swimming pool and slide between the first position and the second position.

5. The pool solar power generator of claim 3, wherein the cover is configured to be submerged under water held by the swimming pool and comprises a shutter including louvers.

6. The pool solar power generator of claim 1, wherein the controller is configured to adjust the position or the tilt of the solar cells based at least on the position of the sun relative to the swimming pool so that the amount of energy produced by the solar cell module increases.

7. The pool solar power generator of claim 1, wherein the controller is configured to adjust the position or the tilt of the solar cells based at least on the measure of energy produced by solar cell module so that the amount of energy produced by the solar cell module increases.

8. The pool solar power generator of claim 1, wherein the controller is configured to adjust the tilt of the solar cells in response to detecting with the sensor that the person is in the vicinity of the swimming pool.

9. The pool solar power generator of claim 1, wherein the inner wall is a bottom inner wall of the swimming pool.

10. The pool solar power generator of claim 1, wherein the inner wall is a side inner wall of the swimming pool.

11. The pool solar power generator of claim 1, wherein when the solar cells are exposed to the sunlight, the controller is configured to activate a visible alarm or an audible alarm in response to detecting with the sensor that the person is in the vicinity of the swimming pool.

12. The pool solar power generator of claim 1, wherein the swimming pool is within a swimming pool area, and the controller is configured to lock a gate to the swimming pool area when the solar cells are exposed to the sunlight.

13. The pool solar power generator of claim 1, further comprising a plurality of mirrors disposed beneath the swimming pool, the plurality of mirrors configured to redirect the sunlight to the solar cell module.

14. The pool solar power generator of claim 1, further comprising a cooler configured to cool the solar cell module using water from the swimming pool.

15. The pool solar power generator of claim 1, in combination with the swimming pool, wherein the swimming pool is oriented in a north-south direction, a north end of the swimming pool being wider and shallower than a south end of the swimming pool.

16. The pool solar power generator of claim 1, wherein the location external to the swimming pool is a house power grid.

* * * * *